H. MASON.
WASHING APPARATUS.
APPLICATION FILED AUG. 7, 1915.

1,183,391.

Patented May 16, 1916.
2 SHEETS—SHEET 1.

Witnesses
Chas. W. Stauffiger
Karl H. Butler

Inventor
Harry Mason,
By
Attorneys

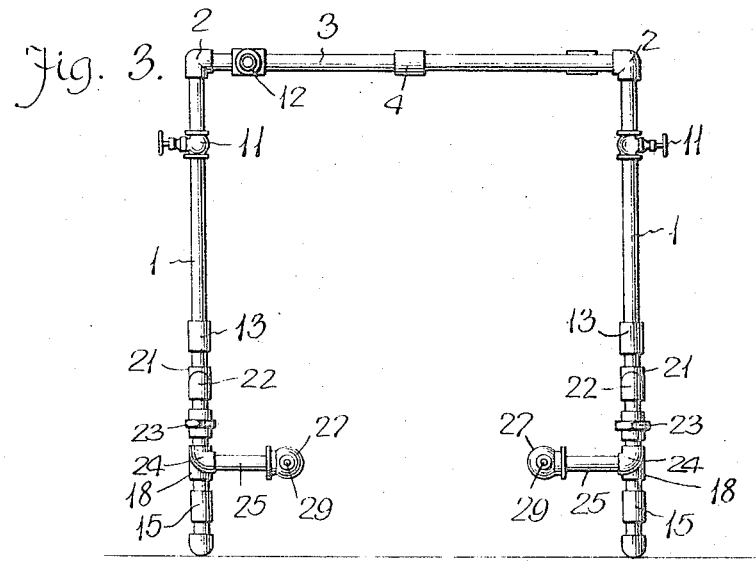
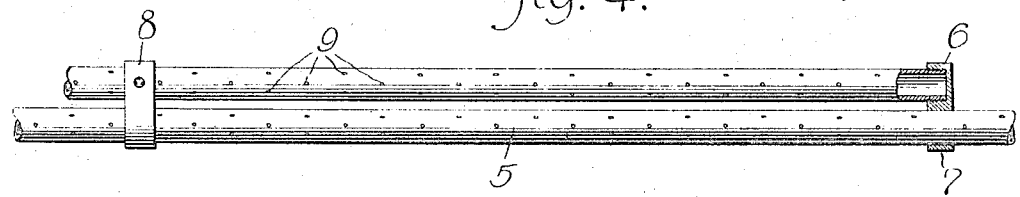
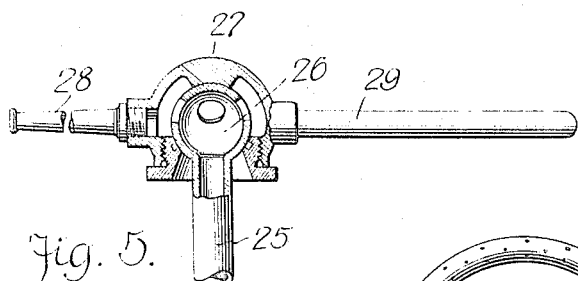
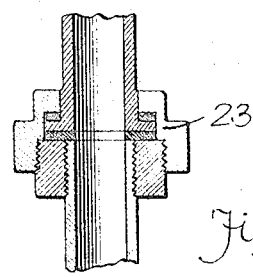
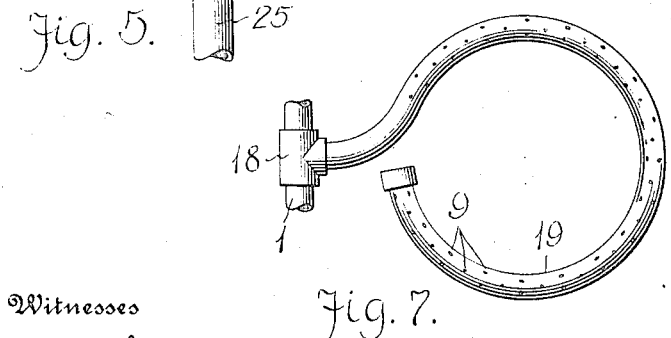

UNITED STATES PATENT OFFICE.

HARRY MASON, OF DETROIT, MICHIGAN.

WASHING APPARATUS.

1,183,391. Specification of Letters Patent. Patented May 16, 1916.

Application filed August 7, 1915. Serial No. 44,251.

*To all whom it may concern:*

Be it known that I, HARRY MASON, a citizen of the United States of America, residing at Detroit, in the county of Wayne and State of Michigan, have invented certain new and useful Improvements in Washing Apparatus, of which the following is a specification, reference being had therein to the accompanying drawings.

This invention relates to a vehicle washing apparatus, especially designed for an automobile garage or laundry.

The primary object of my invention is to provide a novel framework under which an automobile or similar vehicle may be run and subjected to the action of water or a liquid cleansing agent, to facilitate thoroughly washing and cleaning the exterior of an automobile.

Another object of this invention is to provide an automobile sprinkling frame with novel nozzles which permit of all parts of the running gear of an automobile being subjected to jets or streams of water.

A further object of my invention is to provide an apparatus of the above type wherein the parts are constructed with a view of reducing the cost of manufacture and at the same time retaining the features by which durability, simplicity and ease of assembling are secured, and with such ends in view my invention resides in the novel construction, combination and arrangement of parts to be hereinafter specifically described and then claimed.

Reference will now be had to the drawings, wherein—

Figure 1:
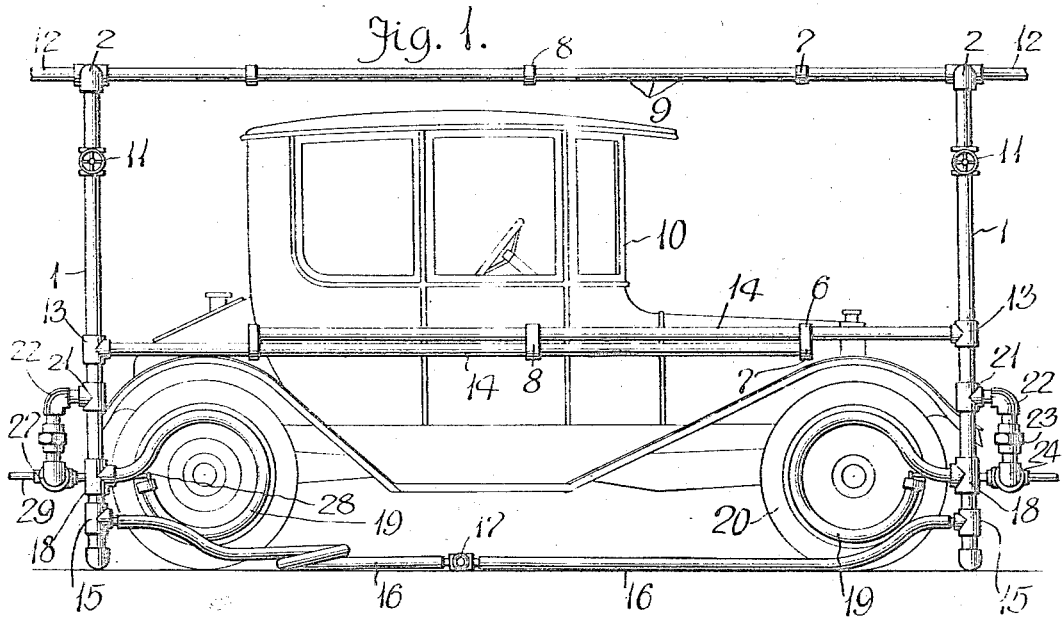
Figure 2:
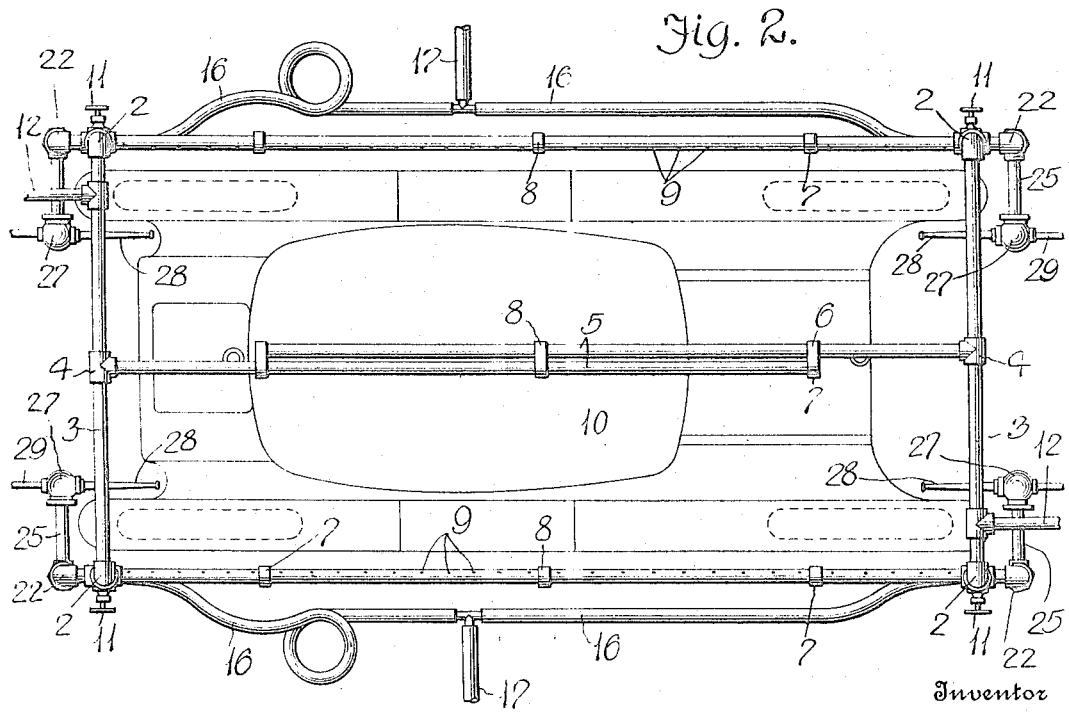

Figure 1 is a side elevation of a washing apparatus showing a vehicle in position to be washed; Fig. 2 is a plan of the same; Fig. 3 is an end view of the apparatus; Fig. 4 is an enlarged elevation of sprinkler pipes coupled to slide one into the other; Fig. 5 is a detail sectional view of a universal nozzle adapted to form part of the apparatus; Fig. 6 is an enlarged sectional view of a union or universal coupling, and Fig. 7 is an enlarged elevation of a wheel sprinkling pipe or nozzle.

In describing my invention by aid of the views above referred to, I desire to point out that the same are merely intended as illustrative of an example whereby my invention may be applied in practice, and I do not care to limit my invention to the precise construction and arrangement of parts shown. The following description is therefore to be broadly construed as including substitute constructions and arrangement of parts which are the obvious equivalents of those to be hereinafter referred to.

In the drawings, 1 denotes tubular corner posts having the upper ends thereof provided with elbows 2 connected by tubular cross heads 3 and intermediate said cross heads are T connections 4 for overhead sprinkler pipes 5. The overhead sprinkler pipes 5 extend inwardly into parallelism, as shown in Figs. 2 and 4, and the ends of said sprinkler pipes are closed by caps 6 having guides 7 for said pipes, the guide of one pipe supporting the other pipe, whereby said overhead sprinkler pipes can be longitudinally adjusted relative to each other. An intermediate guide 8 is also employed to maintain the pipes 5 in parallelism and adds rigidity to the same, particularly when extended. The lower sides of the overhead pipes 5 are provided with apertures or perforations 9 whereby water or other cleansing fluid can be sprinkled upon the top of an automobile 10 or other vehicle placed under the overhead sprinkling pipes.

The tubular corner posts 1 are provided with globe valves 11 of a conventional form and contiguous to an end of each tubular cross head 3 is a T connection 12 which permits of a supply of water being connected to the tubular cross heads 3 whereby when the valves 11 are closed, the overhead sprinkler pipes 5 can be used independently of any water supply of the tubular corner posts.

The tubular corner posts 1 have side sprinkler pipes 14 with the inner sides thereof perforated or apertured to sprinkle the side panels or walls of the automobile 10, said side sprinkler pipes being constructed upon the same principle as the overhead sprinkler pipes 5.

Adjacent to the lower ends or feet of the tubular corner posts 1 are T connections 15 for branches 16 of a main hose 17 adapted to supply the tubular corner post 1 with water, at each side of the apparatus, as best shown in Fig. 2. Above the T connections 15 of the tubular corner post 1 are T connections 18 for wheel sprinkling pipes or circular perforated members 19 adapted to discharge water against the outer sides of the wheels 20 of the automobile 10 contiguous to the fellies of said wheels. The wheel sprinkling pipes are curved downwardly to permit of said pipes draining water therein after the supply of water is shut off to the tubular corner posts 1, and these posts below the T connections 15, are preferably solid or plugged whereby water cannot accumulate in the same.

Between the T connections 13 and 18 of each tubular corner post is a T connection 21 provided with an elbow 22 supporting a union or swivel joint 23 which permits of an elbow 24, supported by said swivel joint, being swung in a lateral plane. Each of the elbows 24 has a tubular arm 25 terminating in a hollow apertured ball member 26. On the ball member 26 is universally mounted a socket member 27 provided with a nozzle 28 and a handle 29, said handle longitudinally alining with the nozzle to facilitate moving the nozzle in a desired direction.

As best shown in Fig. 2, the nozzles 28 are in position to play water against the inner sides of the wheels 20 of the automobile and against any part of the running gear of the car. It is through the medium of the swivel connection 23 and the universal joint of the nozzles that said nozzles can be swung to direct a stream of water against any part of the running gear, and when an automobile is given proper attention, it is unnecessary for manual operations under an automobile to remove dirt and foreign matter.

The apparatus in its entirety obviates the necessity of using buckets of water and a hose for supplying water to an automobile for cleaning purposes, since with my improved apparatus, it is only necessary to use a sponge, chamois or brush upon such parts of an automobile where the dirt or foreign matter has become indurate and not susceptible to the action of a jet or stream of water discharged thereon.

With the ends of the apparatus adjustably connected together through the medium of the top and side sprinkling pipes, it is possible to increase or decrease the longitudinal dimension of the apparatus whereby automobiles or vehicles of various lengths can be run into the framework of the apparatus and thoroughly washed. By having the end frames of the apparatus adjustably connected, it is also possible to materially shorten the length of the apparatus whereby it will occupy a comparatively small space in a garage when not in use, and in such position, it is still possible to place an automobile in storage in the apparatus.

It will of course be understood that the set of nozzles at either end of the apparatus will be swung to one side when an automobile is run into the framework, and with the framework made of ordinary water pipes or rigid tubing, the entire apparatus presents a substantial structure and easy access is had to any part of the same.

It is apparent from the foregoing that the apparatus embodies telescopic or end frames movable toward and away from each other, and that each end frame, besides supporting top and side sprinkling pipes, has inner and outer wheel nozzles with the outer nozzles stationary and the inner nozzles movable, said nozzles coöperating with the top and side sprinkling pipes in thoroughly subjecting the exterior of an automobile or similar vehicle to a bath.

What I claim is:—

1. An automobile washing apparatus embodying end frames movable to and from each other, sprinkler pipes between said end frames, and wheel nozzles carried by said end frames.

2. An automobile washing apparatus embodying end frames, movable to and from each other, top and side sprinkler pipes carried by each end frame, and wheel nozzles carried by each end frame.

3. An automobile washing apparatus embodying end frames, movable to and from each other, top and side sprinkler pipes connecting said end frames, and outer and inner wheel nozzles carried by each end frame.

4. An automobile washing apparatus embodying end frames movable to and from each other, top and side sprinkler pipes connecting said end frames, stationary outer wheel nozzles carried by each end frame, and movable inner wheel nozzles carried by each end frame.

5. An automobile washing apparatus embodying end frames movable to and from each other, top and side sprinkler pipes connecting said end frames, and universal nozzles carried by each end frame.

6. An automobile washing apparatus embodying end frames movable to and from each other, side sprinkler pipes connecting said frames, outer circular wheel nozzles carried by each end frame, and inner universal wheel nozzles carried by each end frame.

7. An automobile washing apparatus embodying connected end frames, outer circular wheel nozzles carried by each frame, an inner universal wheel nozzle carried by each frame.

8. An automobile washing apparatus embodying end frames, top sprinkler pipes connecting said frames, side sprinkler pipes connecting said frames, independent water connections for said top and side sprinkler pipes, and universal wheel nozzles carried by each end frame.

9. An automobile washing apparatus embodying end frames movable to and from each other and each frame comprising tubular corner posts, a tubular head connecting said posts, a top sprinkler pipe carried by said head, side sprinkler pipes carried by said corner posts, a water connection for said head, a water connection for each post, outer circular wheel nozzles for said posts, inner universal wheel nozzles for said posts, and means movably connecting the top and side sprinkler pipes of one end frame to the top and side sprinkler pipes of the other end frame.

In testimony whereof I affix my signature in presence of two witnesses.

HARRY MASON.

Witnesses:
ANNA M. DORR,
KARL H. BUTLER.